United States Patent [19]

Yamazaki et al.

[11] Patent Number: 5,272,743
[45] Date of Patent: Dec. 21, 1993

[54] KEY MEMBER FOR USE IN INSERTION OR REMOVAL OF A FUEL ROD OF A NUCLEAR FUEL ASSEMBLY GRID

[75] Inventors: Shuji Yamazaki; Akihiro Kato; Masashi Yoshida, all of Ibaraki, Japan

[73] Assignee: Mitsubishi Nuclear Fuel Co., Tokyo, Japan

[21] Appl. No.: 981,105

[22] Filed: Nov. 24, 1992

[51] Int. Cl.$^5$ .............................................. G21C 3/334
[52] U.S. Cl. .................................... 376/463; 376/261; 376/446
[58] Field of Search ............... 376/260, 261, 441, 442, 376/446, 463

[56] References Cited

U.S. PATENT DOCUMENTS

| | | | |
|---|---|---|---|
| 3,982,994 | 9/1976 | Jabsen | 376/446 |
| 4,729,867 | 5/1988 | DeMario | 376/261 |
| 5,061,437 | 10/1991 | Whitt | 376/442 |
| 5,068,081 | 11/1991 | Oyama et al. | 376/261 |

*Primary Examiner*—Daniel D. Wasil
*Attorney, Agent, or Firm*—Oblon, Spivak, McClelland, Maier & Neustadt

[57] ABSTRACT

A key member, a method for insertion and/or removal of the fuel rods in a nuclear fuel assembly using the key member and a method of disassembling the nuclear fuel assembly using the same key member are disclosed. The key member has first projections and second projections formed on the opposite faces of an elongated key body. In the insertion or removal of the fuel rods or in the disassembling the nuclear fuel assembly, the key member is inserted into the grid and rotated to bring the first projections and the second projections into engagement with the straps of the grids and the springs on the straps to thereby deflect the springs in a direction away from the dimples opposing the springs. In this situation, the insertion and removal of the fuel rods can be carried out. Further, in disassembling the nuclear fuel assembly, space required for inserting the key member into the grids may be ensured by subjecting prescribed portions of control rod-guide pipes and instrumentation pipes to cutting work and bulging the cut ends to move the cut end away from that of the opposing cut ends of the cut piece. The space may be formed by removing the control rod-guide pipes and instrumentation pipes after having formed slits in the pipes.

1 Claim, 8 Drawing Sheets

KEY MEMBER FOR USE IN INSERTION OR REMOVAL OF A FUEL ROD OF A NUCLEAR FUEL ASSEMBLY GRID

BACKGROUND ART

The present invention pertains to a key member for use in inserting fuel rods into a nuclear fuel assembly grid or in removing the fuel rods from the nuclear fuel assembly grid, and a method for insertion or removal of fuel rods using the same key member. The invention further relates to a method for disassembling a nuclear fuel assembly using the same key member.

In a known nuclear fuel assembly, a pair of top and bottom nozzles are arranged in a spaced relation to each other, and a plurality of grids each formed of straps are disposed between the nozzles so as to be spaced from each other. Control-rod guide pipes and measuring instrument pipes are inserted through the grid cells of the grid, fixedly secured to the grid, and connected to the nozzles. A plurality of fuel rods are inserted through the grid cells of the grids and resiliently supported by springs formed on the grids.

In a conventional assembly method of the nuclear fuel assembly as constructed above, if the fuel rods are simply inserted into the grid cells, the fuel rods are constricted between with the springs and dimples on the grids, so that the outer peripheral surface of each fuel rod may be scratched. Various proposals have hitherto been made in order to circumvent this problem. For example, as disclosed in U.S. Pat. No. 5,068,081, a method utilizing a deflecting jig of an expander type capable of being enlarged in diameter has been proposed. In this method, an opening for inserting a key member is formed in each grid, and the springs are deflected by inserting the jig into the grid cells of the grid and enlarging the same. Then, the key member is inserted through the opening to maintain the springs deflected, and fuel rods are smoothly inserted through the grid cells.

However, in the above method, the deflecting jig must be used since the key member is not provided with the function to deflect the springs, and hence, in addition to the necessity of preparing the deflecting jig, an extra step of applying the deflecting jig is required.

Furthermore, when it is necessary to dismantle the nuclear fuel assembly, if the fuel rods can be removed from the grid by, for example, inserting the key member through the opening and operating the same to release the engagement of the fuel rods with the grids, the fuel rods thus removed can be put into repeated use for a new nuclear fuel assembly. However, once the assembling of the nuclear fuel assembly is completed, the opening for the insertion of the key member is obstructed by the control-rod guide pipes or measuring instrument pipes, so that the key member cannot be inserted any longer. Therefore, it has been desired to devise an arrangement to provide access to the space for the insertion of the key member.

SUMMARY OF THE INVENTION

It is therefore a primary object of the present invention to provide a novel key member which can release the constrictive engagement of the fuel rods with the springs and dimples, without using a special device such as the aforementioned spring-deflecting jig, and ensuring sufficient cell sizes required for the assembling and/or disassembling of the nuclear fuel assembly.

Another object of the present invention is to provide a method for insertion and removal of fuel rods which can be effected very efficiently using the aforesaid key member, and by which the fuel rods can be easily inserted into and removed from the grid without being damaged.

A further object of the invention is to provide a method for disassembling a nuclear fuel assembly which is particularly suitably practiced using the aforesaid key member.

According to a primary aspect of the present invention, there is provided a key member for use in insertion and removal of a fuel rod into and from a nuclear fuel assembly grid which includes a plurality of elongated straps intersecting generally perpendicularly with each other to define a plurality of grid cells therein, and a plurality of pairs of dimples and springs formed on the straps for supporting a plurality of fuel rods such that each pair of dimple and spring are disposed in facing relation to each other, and which includes key member-accommodating openings formed at the intersections of the straps so as to define peripheral ends therearound, the key member comprising an elongated key body having a pair of opposite surfaces, the key body including a plurality of first projections adapted to be held in engagement with the peripheral end of the opening of the strap and a plurality of second projections adapted to be held in engagement with the spring to deflect the spring away from the dimple facing thereto, the first projections and the second projections being formed on the opposite surfaces alternately in a staggered relation to one another.

According to another aspect of the present invention, there is provided a method for insertion and removal of a fuel rod into and from a nuclear fuel assembly grid which includes a plurality of elongated straps intersecting generally perpendicularly with each other to define a plurality of grid cells therein, and a plurality of pairs of dimples and springs formed on the straps for supporting a plurality of fuel rods such that each pair of dimple and spring are disposed in facing relation to each other, and which includes key member-accommodating openings formed at the intersections of the straps so as to define peripheral ends therearound, the method comprising the steps of:

(a) preparing a plurality of key members each including an elongated key body having a longitudinal axis and a pair of opposite surfaces, the key body including a plurality of first projections and a plurality of second projections formed on the opposite surfaces alternately in a staggered relation to one another;

(b) inserting each of the key members in the grid while causing the key member to pass through the openings of the straps disposed parallel to each other in such a manner as to extend along a respective strap intersecting the aforesaid parallel straps;

(c) turning each of the key members about the longitudinal axis to bring the plurality of first projections into engagement with the peripheral ends of the openings of the aforesaid parallel straps and to bring the plurality of second projections into engagement with the springs on the aforesaid strap intersecting the parallel straps to deflect the springs away from the dimples opposing thereto; and (d) inserting the fuel rods into the grid cells of the grid or removing the same therefrom.

According to a further aspect of the invention, there is provided a method for disassembling a nuclear fuel assembly which includes top and bottom nozzles disposed in spaced relation to each other, a plurality of grids disposed between the top nozzle and the bottom nozzle so as to be spaced from each other and to define grid cells, a plurality of pipes connected to the top and bottom nozzles for accommodating control-rods and measuring instrument, a plurality of pairs of dimples and springs formed on the straps for supporting a plurality of fuel rods such that each pair of dimple and spring are disposed in facing relation to each other, the method comprising the steps of:

(a) preparing a plurality of key members each including an elongated key body having a longitudinal axis and a pair of opposite surfaces, the key body including a plurality of first projections and a plurality of second projections formed on the opposite surfaces alternately in a staggered relation to one another;

(b) working the plurality of pipes to ensure spacings in the grid for inserting the key members;

(c) inserting each of the key members into the grid while causing the key member to pass through the spacings formed by the working of the pipes;

(d) turning each of the key members about the longitudinal axis to bring the plurality of first projections into engagement with the peripheral ends of the openings of the straps disposed parallel to each other and to bring the plurality of second projections into engagement with the springs on a respective strap intersecting the aforesaid parallel straps to deflect the springs away from the dimples opposing thereto; and (e) subsequently removing the fuel rods from the grid cells of the grid.

In the foregoing, the working step (b) may include cutting the pipes transversely thereof at positions adjacent to the openings at the intersections of the straps, and enlarging the pipes at the cut portions to reduce the longitudinal lengths of the pipes to thereby ensure the aforesaid spacings for inserting the key members. Furthermore, the same working step may include forming slots at bulged portions of the pipes, and removing the pipes to thereby ensure spacings for inserting the key members.

DETAILED DESCRIPTION OF THE INVENTION

Figure 1:
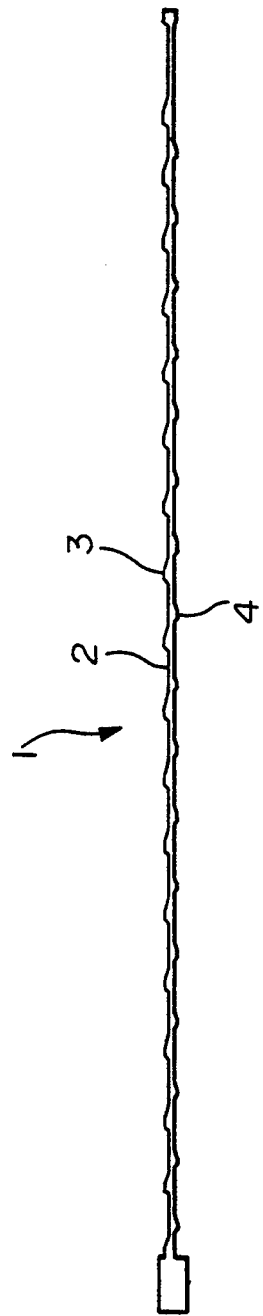
FIG. 1 is a front elevational view of a key member in accordance with a first embodiment of the present invention.
Figure 2:
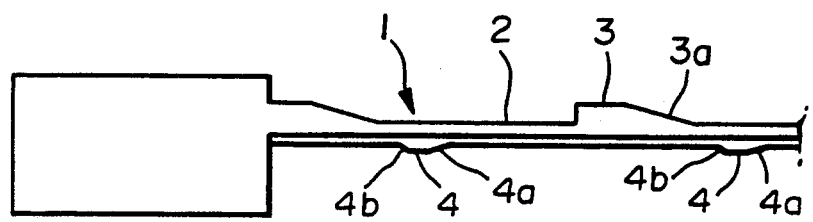
FIG. 2 is an enlarged view of a proximal end of the key member of FIG. 1.

FIGS. 1 and 2 depict an inner key member for use in insertion and removal of fuel rods in accordance with an embodiment of the present invention. The key member, generally designated by 1, comprises an elongated key body 2 having a pair of opposite side faces and having a plurality of first projections 3 and a plurality of second projections 4 formed alternately on the opposite side faces in staggered relation to one another. Each first projection 3 is of a trapezoidal shape having an inclined surface 3a directing toward the proximal end of the key body 2, and is adapted to be held in engagement with the peripheral end around an opening 5a formed in each inner strap 5. Each second projection 4 has inclined surfaces 4a and 4b facing the proximal and distal ends thereof, respectively, and is adapted to deflect a spring 5b in a direction away from a dimple 5c opposing thereto when the key member 1 is inserted through the opening 5 into the grid cells of the grid and is operated in a manner as will be described later.

In conjunction with the disassembling of a nuclear fuel assembly, the method of insertion and removal of the fuel rods using the aforesaid key member will now be described.

Figure 8:
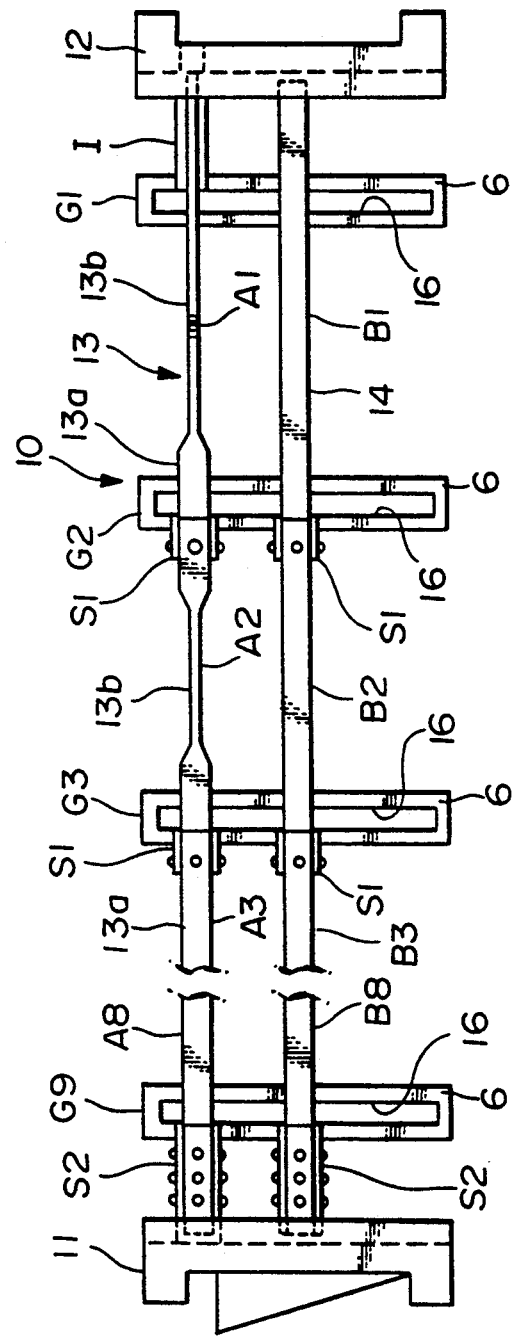
FIG. 8 is a schematic overall view of a nuclear fuel assembly to which the present invention is applied.

First, a nuclear fuel assembly 10 as illustrated in FIG. 8 is horizontally placed on an assembly base which may be the same one as that used during the assembling operation or may be another similar base. The nuclear fuel assembly 10 placed on the assembly base includes a pair of top and bottom nozzles 11 and 12 spaced apart from each other, and a plurality of, e.g., nine grids G1, G2, G3-G9 arranged between the top and bottom nozzles 11 and 12 in a spaced relation to each other. Each of the grids G1 to G9 includes a plurality of inner straps 5 intersecting generally perpendicular to each other to define a plurality of grid cells therein and a plurality of outer straps 6 intersecting perpendicular to each other and covering the inner straps 5 to complete outermost grid cells defined by the inner straps. Provided on the strap walls defining a respective grid cell are opposed pairs of dimple 5c and spring 5b which cooperate with each other to constrict the fuel rod 15 therein. In each of the grids G1 to G9, an opening 5a is formed at each of the intersections of the inner straps 5 for enabling the insertion of the inner key member 1, whereas openings 16 are also formed in the outer straps 6 for enabling the insertion of the key members therethrough.

A plurality of control-rod guide pipes 13 are inserted through the grid cells of the grids G1-G9, and are secured at their one ends to the grid G1 through inserts or sleeves I and at the other ends to the bottom nozzle 12. In addition, a plurality of measuring instrument pipes 14 are inserted through the grid cells disposed at the central portion of the grids, and are secured at their one ends to the grid G1 through the inserts I and at the other ends to the bottom nozzle 12. Specifically, each of the control rod-guide pipes 13 and the instrumentation pipes 14 is provided with a bulged or enlarged portion, and is secured to each of the grids G2 to G9 with the bulged portion being fixed to the grid through a sleeve S1 or S2. In each of the control rod-guide pipes 13, that portion between the top nozzle 11 and a position displaced a predetermined distance from the grid G3 toward the bottom nozzle 12, as well as those upper and lower portion (left and right portions in FIG. 8) sandwiching the grid G2, are formed into larger-diameter portions 13a, whereas the remaining portions are formed into a smaller-diameter portions 13b.

Furthermore, a plurality of fuel rods 15 are inserted through the grid cells of the grids and held by the grids by being urged by the springs formed on the straps of the grids G1 to G9 towards the dimples opposing thereto.

The nuclear fuel assembly 10 thus constructed is secured on the assembly support in a horizontal manner, and the top nozzle 11 is removed from the control-rod guide pipes 13 and the measuring instrument pipes 14. Subsequently, a cutter 20 or a cutting device is secured on a support (not shown) which is arranged adjacent to the top nozzle 11 disposed on the aforesaid base.

Figure 9:
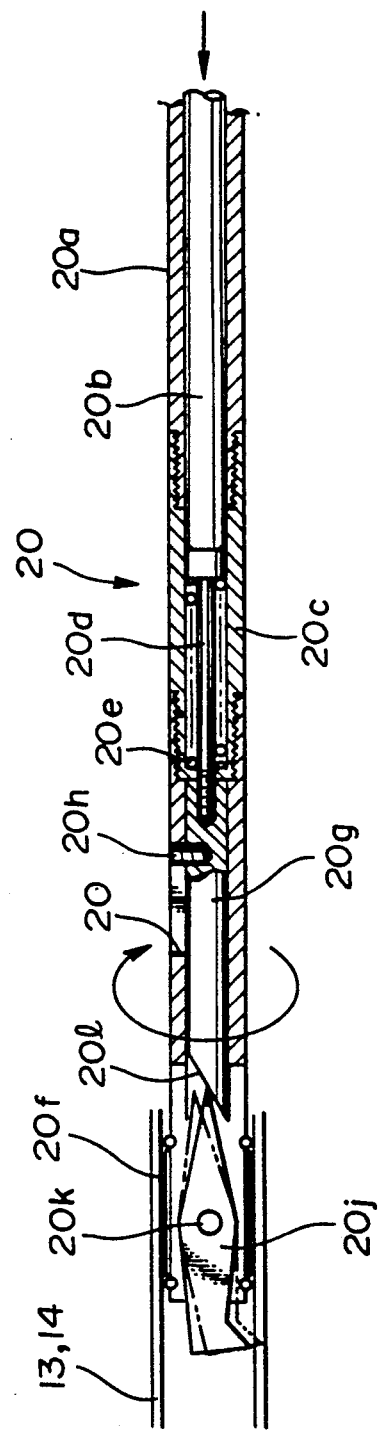
FIG. 9 is a cross-sectional view showing a cutting device.
Figure 10:
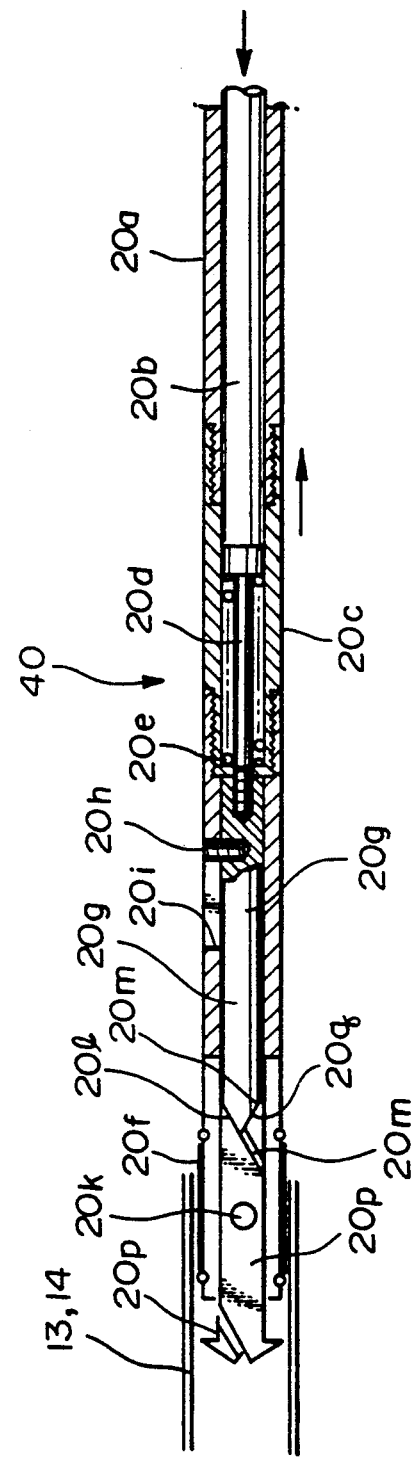
FIG. 10 is a view similar to FIG. 9, but showing a modified cutting device.
Figure 11:
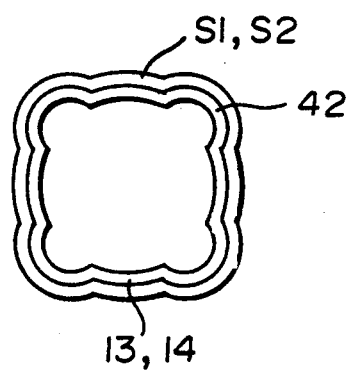
FIG. 11 is a schematic view of a bulged portion of a control rod-guide pipe or an instrumentation pipe prior to the formation of slits.

As depicted in FIG. 9, the cutter 20 includes an elongated outer tube 20a; a pushing rod 20b inserted through the outer tube 20a for sliding movement therealong; a spring-accommodating tube 20c threaded on the forward end of the outer tube 20a and having an end plate; a spring-retaining member 20d of a rod-like shape disposed in the spring-accommodating tube 20c for sliding movement therealong and having an enlarged portion at a side adjacent to the outer tube 20a; and a coil spring 20e disposed around the spring-retaining member 20d so as to act between the end plate of the spring-accommodating tube 20c and the enlarged portion of the spring-retaining member 20d to urge the retaining member 20d away from the end plate. A tubular guide member 20f, which has an elongated aperture 20i formed therein so as to extend longitudinally thereof, is threaded on the forward end of the spring-accommodating tube 20c. In addition, a pushing member 20g, which is provided with a radially outwardly protruding member 20h threaded thereon, is threaded on the forward end of the spring-retaining member 20d, and is accommodated in the tubular guide member 20f for sliding movement therealong with the protruding member 20d being engaged with the elongated aperture 20i. Furthermore, a cutter blade 20j is accommodated in the tubular guide member 20f for rotation about a shaft 20k which is journaled on the guide member 20f so as to extend transversely thereof. The pushing member 20g has an inclined face 201 formed at its forward portion, and is adapted to engage with the rearward end of the cutter blade 20j. In operation, the pushing rod 20b is forwarded, the inclined face 201 of the pushing member 20g is brought into engagement with the cutter blade 20j to bring the cutting edge portion of the cutter blade into engagement with the inner peripheral surface of the control rod-guide pipe 13 or the measuring instrument pipe 14, and the outer tube 20a and hence the spring-accommodating tube 20c and the guide member 20f are rotated circumferentially to turn the cutter blade along the inner peripheral surface of the control rod-guide pipe 13 or the measuring instrument pipe 14, whereby the control rod-guide pipe 13 or the measuring instrument pipe 14 is cut by the blade in its circumferential direction.

In the cutting operation of the control rod-guide pipe 13 or the instrument pipe 14 by means of the cutter 20, the cutter 20 is inserted into the control rod-guide pipe 13 or the instrumentation pipe 14 from the upper end thereof (from the left end in FIG. 8), and that portion of the pipe which is located at a position slightly displaced from the opening 16 of the grid G1 toward the bottom nozzle 12 is first cut. Thereafter, the cutting is successively carried out at a respective position displaced slightly from the opening 16 of each of the grids G2 to G9 toward the top nozzle 11. In the foregoing, different kinds of the guide member 20f are prepared in advance so as to be used for pipes of different diameters. Specifically, in the cutting of the smaller diameter portions 13b of the control rod-guide pipes 13, a guide member 20f of a smaller diameter is mounted on the cutter, whereas in the cutting of the larger diameter portions 13a of the control rod-guide pipes 13 and the instrumentation pipe 14, a guide member of a larger diameter is used.

Thus, after each of the control rod-guide pipes 13 or each of the measuring instrument pipes 14 is cut into a plurality of cut pipes A1 to A8 or B1 to B8, the inner peripheral surfaces of the cut pipes are examined with an endoscope to confirm that the cutting is properly carried out, following which the cutter 20 is removed from the base. Subsequently, a bulging apparatus, not shown, is secured on the base, and the cut pipes are subjected to bulging operations, in the order of from A1 to A8 B1 to B8), thereby reducing the longitudinal length of each cut pipe. As a result, the cut pipes A1 to A8 and B1 to B8 are deformed away from the openings 16 for inserting the key members.

Thereafter, outer key members for deflecting the springs on the outer straps 6 and the inner key members 1 for deflecting the springs on the inner straps 5 are detachably attached to the outer straps 6 and the inner straps 5.

Figure 3:
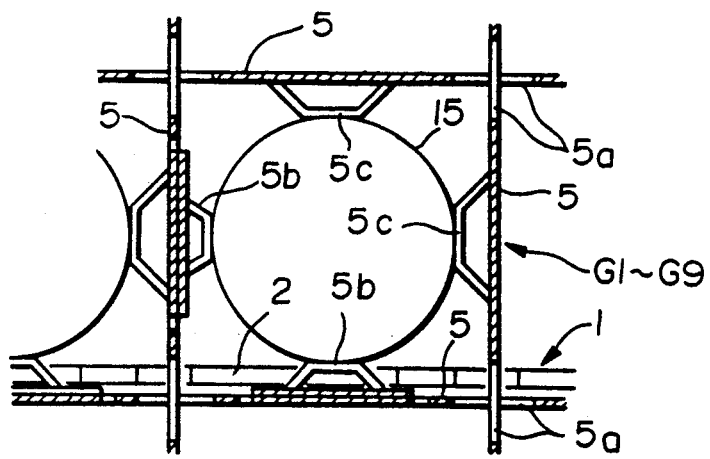
FIG. 3 is a cross-sectional view of a grid, showing the state in which the key member of FIG. 1 is inserted in the grid.
Figure 4:
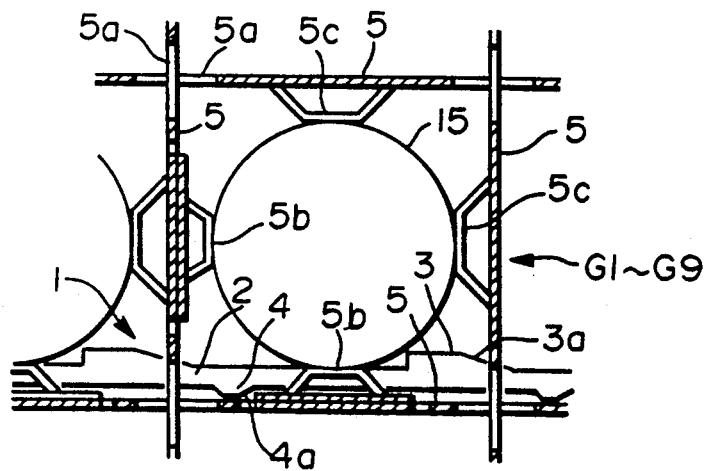
FIG. 4 is a view similar to FIG. 3, but showing the state in which the key member is rotated 90 degrees from the state of FIG. 3.
Figure 5:
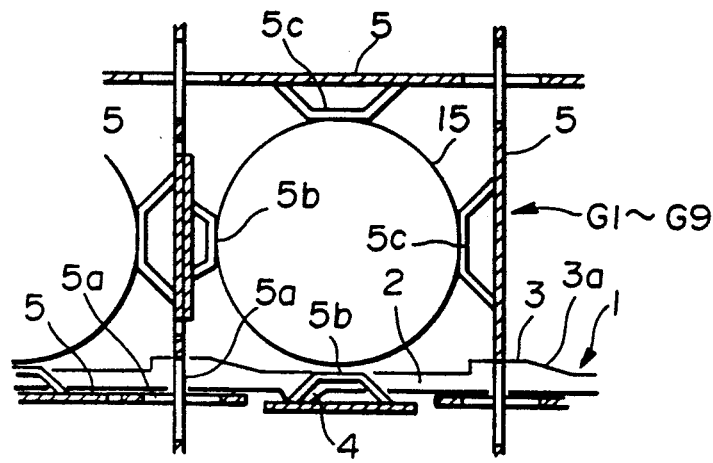
FIG. 5 is a view similar to FIG. 3, but showing the state in which the key member is further pulled inwardly of the grid from the state of FIG. 4.
Figure 6:
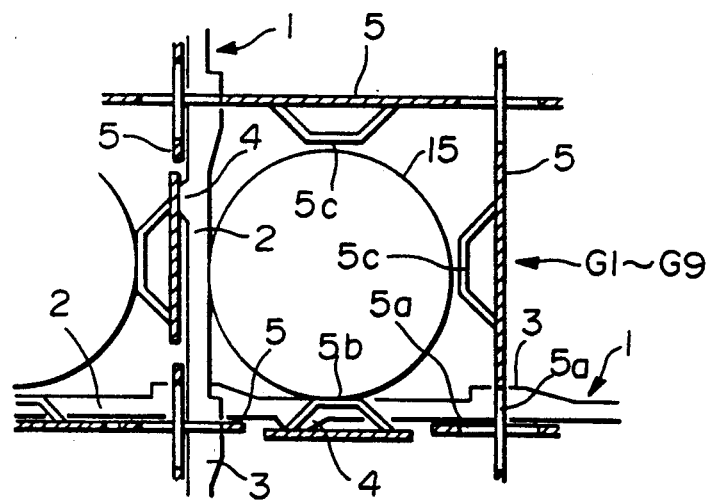
FIG. 6 is a view similar to FIG. 3, but showing the state in which the setting of the key member is completed.
Figure 7:
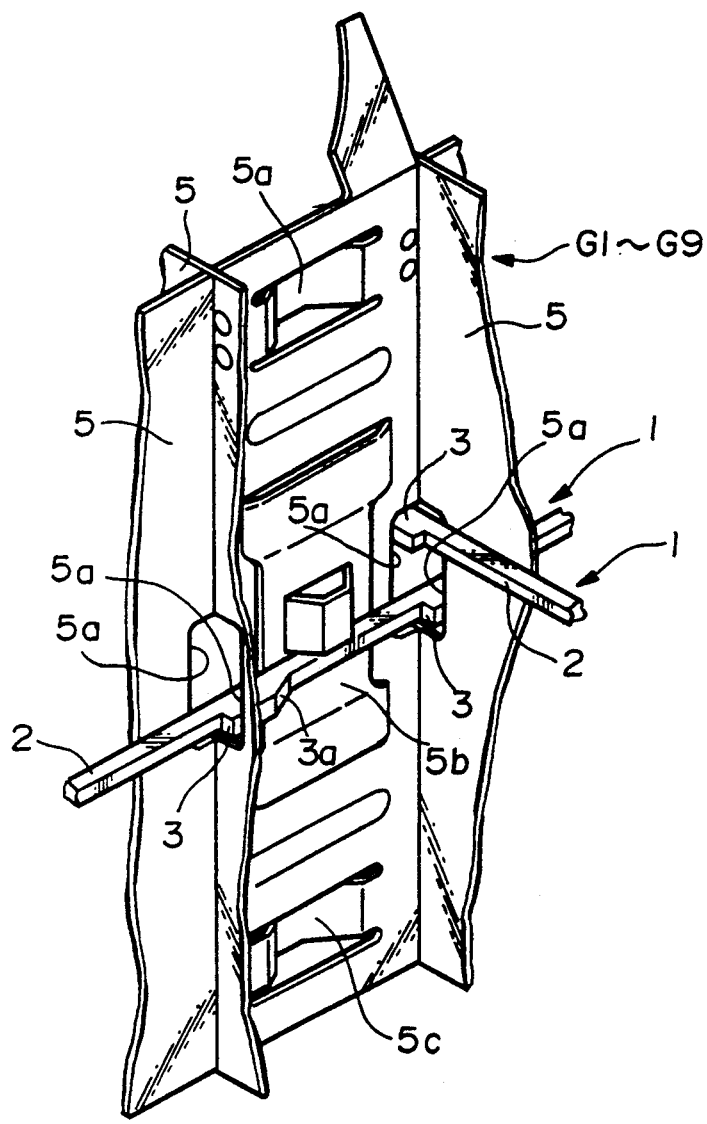
FIG. 7 is a perspective view showing the completed state shown in FIG. 6.

In operation, the inner key member 1 is inserted through the opening 16 into a respective one of the openings 5a (see FIG. 3). Then, the inner key member 1 is turned 90 degrees about its longitudinal axis (see FIG. 4), and is caused to move forwardly (see FIG. 5). With this movement, the inclined surface 3a of each first protrusion 3 formed on the one side of the inner key member 1 is guided by the peripheral end of the opening 5a, and the first protrusion 3 is brought into engagement therewith, whereas the inclined surface 4a of the second protrusion 4 is brought into abutment with the spring 5b to be urged thereagainst, and finally the protruding surface of the second protrusion 4 is brought into abutment with the spring 5b to deflect the spring 5b in a direction away from the dimple 5c opposing thereto. The above operation is repeatedly carried out to insert a great number of inner key members 1 into the grids G1 to G9 (see FIGS. 6 and 7), and hence the springs 5b on the inner straps 5 can be reliably deflected without damaging the fuel rods 15.

Furthermore, in order to confirm that the fuel rods 15 may be removed easily from each of the grids G1 to G9, a force to hold the fuel rod, i.e., force to draw out the fuel rod, is measured, and then the bulging apparatus is removed from the base, following which the bottom nozzle 12 is removed. Subsequently, after drawing the fuel rods 15 out of the grids G1 to G9 using a pull-in device (not shown), the inspection of the thus drawn fuel rods 15 is commenced.

In the foregoing, in conjunction with the method for drawing out the fuel rods, there is disclosed a method which comprises, prior to the removal of the fuel rods from the grid cells of the grids, cutting the prescribed portions of the control-rod guide pipes and the measuring instrument pipes, and shortening the pipes by enlarging them to thereby ensure the spacings for the insertion of the key members. This method may be modified as follows.

More specifically, a cutter 40 modified from the aforesaid cutter 20 is prepared. The modified cutter 40 is similar to the cutter 20 in that it includes the outer tube 20a; the pushing rod 20b inserted through the outer tube 20a for sliding movement therealong; the spring-accommodating tube 20c threaded on the forward end of the outer tube 20a; the spring retaining member 20d disposed in the spring-accommodating tube 20c for sliding movement therealong; the spring 20e acting between the spring-accommodating tube 20c and the retaining member 20d to urge the retaining member 20d away from the end plate of the spring-accommodating tube 20c; the guide member 20f detachably threaded on the spring-accommodating tube 20c; and the pushing member 20g with the protruding member 20h secured to the spring-retaining member 20d. However, a pair of cutter blades 20p and 20p, each of which has a cutting edge portion at its forward end and an inclined surface 20m at its rearward end, are secured to the guide member 20f for rotation about the common shaft 20k which is journaled on the guide member 20f. In addition, the pushing member 20g includes a pair of inclined faces 20q and 20q sloping so as to approach each other in a forward direction, and the cutter blades 20p are arranged so that the cutting edge portions as well as the inclined surfaces 20m are directed in different directions, whereby the inclined faces 20q of the pushing member 20g are adapted to be in engagement with the inclined surfaces 20m, respectively. Thus, in the modified cutter 40, when the pushing rod 20b is forwarded, the inclined faces 20q of the pushing member 20g are brought into pressing engagement with the inclined surfaces 20m of the cutter blades 20j, thereby bringing the forward cutting edge portions of both of the cutter blades 20j into engagement with the inner peripheral surface of the control rod-guide pipe 13 or the measuring instrument pipe 14. Then, the outer tube 20a, and hence the spring accommodating tube 20c and the guiding portion 20f, are caused to move backward in a longitudinal direction of the pipe to thereby form an opposed pair of slits 41 in the pipe.

Figure 12:
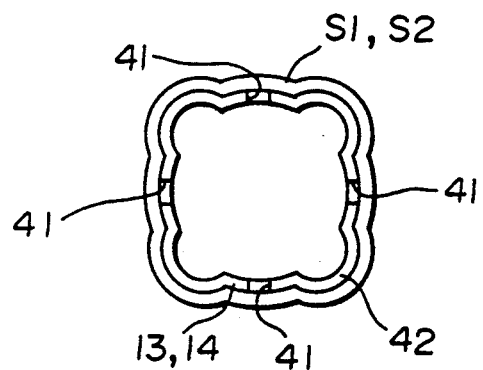
FIG. 12 is a view similar to FIG. 11, but showing the bulged portion after the formation of slits.
Figure 13:
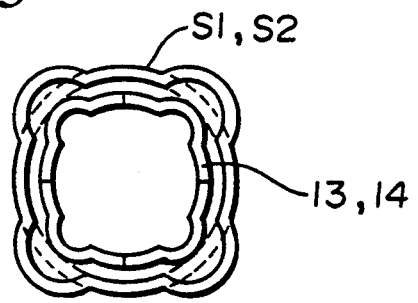
FIG. 13 is a view similar to FIG. 11, but showing the state in which the pipe is reduced in diameter for drawing out the pipe to allow the key member to be inserted.

In the formation of slits 41 in the bulged portion 42 of each of the control rod-guide pipes 13 and the instrument pipes 14, the cutting operation is repeated twice to provide circumferentially equally distributed four slots in each pipe (see FIG. 12). Furthermore, each slit 41 is formed such that when the bulged portion 42 is pressed into a smaller diameter, the width of the slit 41 becomes smaller than the inner diameter of the sleeve S1 or S2.

Thus, the slits are formed in the bulged portion of each of the control rod-guide pipes 13 and the instrument pipes 14, and then the control rod-guide pipes 13 and the instrument pipes 14 are removed from the grids by just pulling them out. Thereafter, the same procedures as mentioned above are repeated.

As described above, since the key member in accordance with the present invention includes a plurality of first projections adapted to be held in engagement with the opening of the strap and a plurality of second projections adapted to be held in engagement with the spring to deflect the spring away from the dimple facing thereto, the key member can be employed to release the constrictive engagement of the fuel rods with the springs and dimples. Therefore, sufficient cell space required for the assembling and/or disassembling of the nuclear fuel assembly can be ensured without using a special device such as a spring-deflecting jig of an expander type.

Furthermore, inasmuch as the aforesaid key member can be employed in both for insertion and removal of fuel rods, the insertion and removal of fuel rods, or the disassembling or assembling of the nuclear fuel assembly can be effected very efficiently without damaging the fuel rods.

What is claimed is:

1. A key member for use in insertion and removal of a fuel rod into and from a nuclear fuel assembly grid which includes a plurality of elongated straps intersecting generally perpendicular with each other to define a plurality of grid cells therein, and a plurality of pairs of dimples and springs formed on the straps for supporting a plurality of fuel rods such that each pair of dimple and spring are disposed in facing relation to each other, and which includes key member accommodating openings formed at the intersections of the straps so as to define peripheral ends therearound, said key member comprising an elongated key body having a pair of opposite surfaces, said key body including a plurality of first projections adapted to be held in engagement with said peripheral end of said opening of said strap and a plurality of second projections adapted to be held in engagement with said spring to deflect the spring away from the dimple facing thereto, said first projections and said second projections being formed on said opposite surfaces alternately in a staggered relation to one another.

* * * * *